United States Patent [19]

Le-Khac

[11] Patent Number: 4,705,773
[45] Date of Patent: Nov. 10, 1987

[54] WATER ABSORBENT POLYMER COMPOSITION

[75] Inventor: Bi Le-Khac, West Chester, Pa.

[73] Assignee: Atlantic Richfield Company, Los Angeles, Calif.

[21] Appl. No.: 866,643

[22] Filed: May 27, 1986

Related U.S. Application Data

[60] Division of Ser. No. 744,872, Jun. 17, 1985, Pat. No. 4,616,063, which is a continuation-in-part of Ser. No. 708,772, Mar. 6, 1985, abandoned.

[51] Int. Cl.$^4$ ............................................. B01J 20/26
[52] U.S. Cl. .................................... 502/402; 502/151; 502/401
[58] Field of Search ..................... 502/402, 401, 151

[56] References Cited

U.S. PATENT DOCUMENTS 4,433,063 2/1984 Bernstein et al. .................. 502/402

FOREIGN PATENT DOCUMENTS 157290 10/1981 Japan ................................... 502/402

*Primary Examiner*—Jacob Ziegler
*Attorney, Agent, or Firm*—Dennis M. Kozak

[57] ABSTRACT

Water-insoluble, water swellable polymer compositions are disclosed. In one embodiment, the polymer composition comprises a copolymer of styrene and meleic anhydride and a multi arm block copolymer of styrene and ethylene oxide. In a preferred embodiment, the maleic anhydride groups of the anhydride-containing copolymer are treated with a strong base to further enhance absorption capacity.

4 Claims, No Drawings

WATER ABSORBENT POLYMER COMPOSITION

This is a division of application Ser. No. 744,872, filed June 17, 1985, now U.S. Pat. No. 4,616,063, which is a continuation-in-part of application Ser. No. 708,772 filed Mar. 6, 1985, now abandoned.

This invention relates to water absorbent resins.

In one of its more specific aspects, this invention relates to water-insoluble, water swellable polymer compositions.

Water absorbent resins are widely used in the manufacture of products which require high water absorption capability. For example water absorbed resins are used in the manufacture of surgical and dental sponges, catamenial tampons, disposable diapers, meat trays, household pet litter, mats, etc. These resins are also used for the modification of soil to improve water retention and increase air capacity and for a host of other applications.

A number of polymer blends and alloys have been developed which exhibit improved stability and water and saline liquid absorption capacity. Thus, U.S. Pat. No. 3,983,095 discloses the preparation of a derivative of a copolymer of maleic anhydride with at least one suitable vinyl monomer in fiber form. U.S. Pat. Nos. 4,332,917 and 4,338,417 disclose polymer alloys of a copolymer of styrene with maleic anhydride and a polymer derived from a monomeric ester having vinyl unsaturation e.g. poly(vinyl acetate), cellulose triacetate, cellulose aceto-butyrate, poly(ethylacrylate) and poly(methylmethacrylate). U.S. Pat. No. 4,420,588 teaches a water-absorbing rubber composition comprising a 1,3-diene rubber and a water-absorbing resin dispersed in the rubber.

This invention provides a novel polymer composition which exhibits excellent stability and excellent water and saline liquid absorption capacity.

According to this invention there is provided a polymer composition which comprises a first copolymer of recurring units of an α,β-ethylenically unsaturated dicarboxylic anhydride and recurring units of at least one monomer selected from the group consisting of ethylene, propylene, isobutylene, a $C_1$ to $C_4$ alkyl acrylate, a $C_1$ to $C_4$ alkyl substituted methacrylate, vinyl acetate, methyl vinyl ether and a styrenic having the formula:

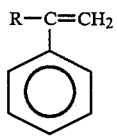

wherein R represents hydrogen, an alkyl group having from 1 to 6 carbon atoms and wherein the benzene ring may be substituted with low molecular weight alkyl, or hydroxy groups; and, a multi arm block second copolymer of styrene and ethylene oxide, wherein at least a portion of the recurring anhydride units of said first copolymer have been hydrolyzed to form hydrogen atoms thereon and wherein at least a portion of the oxide groups of the ethylene oxide are interacted with the said hydrogen atoms such that said first copolymer and said second copolymer are linked by hydrogen bonds.

Also, according to this invention there is provided a method of producing a polymer composition which comprises: (a) mixing a first copolymer of recurring units of an α,β-ethylenically unsaturated dicarboxylic anhydride and recurring units of at least one monomer selected from the group consisting of ethylene, propylene, isobutylene, a $C_1$ to $C_4$ alkyl acrylate, a $C_1$ to $C_4$ alkyl substituted methacrylate, vinyl acetate, methyl vinyl ether and a styrenic having the formula:

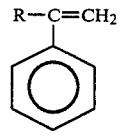

wherein R represents hydrogen, an alkyl group having from 1 to 6 carbon atoms and wherein the benzene ring may be substituted with a low molecular weight alkyl, or hydroxy groups; a multi arm block second copolymer of styrene and ethylene oxide; and an effective amount of water to hydrolyze at least a portion of the recurring anhydride units of said first copolymer to form hydrogen atoms thereon and wherein at least a portion of the oxide groups of the ethylene oxide are interacted with the said hydrogen atoms such that said first copolymer and said second copolymer are linked by hydrogen bonds; and (b) recovering the resulting polymer composition.

According to this invention there is also provided an article having excellent water and saline liquid absorption capacity comprised of a polymer composition which comprises a first copolymer of recurring units of an α,β-ethylenically unsaturated dicarboxylic anhydride and recurring units of at least one monomer selected from the group consisting of ethylene, propylene, isobutylene, a $C_1$ to $C_4$ alkyl acrylate, a $C_1$ to $C_4$ alkyl substituted methacrylate, vinyl acetate, methyl vinyl ether and a styrenic having the formula:

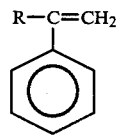

wherein R represents hydrogen, an alkyl group having from 1 to 6 carbon atoms and wherein the benzene ring may be substituted with low molecular weight alkyl, or hydroxy groups; and a multi arm block second copolymer of styrene and ethylene oxide, wherein at least a portion of the recurring anhydride units of said first copolymer have been hydrolyzed to form hydrogen atoms thereon and wherein at least a portion of the oxide groups on the ethylene oxide are interacted with the said hydrogen atoms such that said first copolymer and said second copolymer are linked by hydrogen bonds.

According to this invention there is also provided a method of enhancing the water and saline liquid absorption capacity of an article which method comprises incorporating into the article a polymer composition which comprises a first copolymer of recurring units of an α,β-ethylenically unsaturated dicarboxylic anhydride and recurring units of at least one monomer selected from the group consisting of ethylene, propylene, isobutylene, a $C_1$ to $C_4$ alkyl acrylate, a $C_1$ to $C_4$ alkyl substituted methacrylate, vinyl acetate, methyl vinyl ether and a styrenic having the formula:

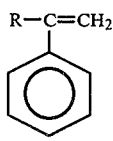

wherein R represents hydrogen, an alkyl group having from 1 to 6 carbon atoms and wherein the benzene ring may be substituted with low molecular weight alkyl, or hydroxy groups; and a multi arm block second copolymer of styrene and ethylene oxide, wherein at least a portion of the recurring anhydride units of said first copolymer have been hydrolyzed to form hydrogen atoms thereon and wherein at least a portion of the oxide groups of the ethylene oxide are interacted with the said hydrogen atoms so that said first copolymer and said second copolymer are linked by hydrogen bonds, the polymer composition being incorporated into the article in an effective amount to enhance the water and saline liquid absorption capacity of the article as compared to the water and saline liquid absorption capacity of the article in the absence of the polymer composition.

In a preferred embodiment, to maximize the liquid absorption capacity of the polymer composition, the hydrogen atoms on the anhydride groups of the first copolymer are modified (partially neutralized) by reaction with a strong organic or inorganic base such as NaOH, KOH, ammonia, ammonia-in-water solutions or organic amines.

An advantage of the polymer compositions of this invention is that they exhibit excellent stability with respect to integrity in the hydrogel or water swollen state. This excellent stability is due to the formation of a continuous phase of the ethylene oxide blocks of the multi arm block copolymer and the styrene/$\alpha,\beta$-ethylenically unsaturated dicarboxylic anhydride copolymer. The polystyrene blocks of the multi arm block copolymer are the disperse phase and form hydrophobic domains which act as reversible crosslinks.

The multi arm block second copolymer employed in this invention will contain from about 5 to about 95 weight percent of styrene and from about 95 to about 5 weight of ethylene oxide. Suitable multi arm block copolymers will have the following general formula

wherein each A separately represents a polystyrene segment having a number average molecular weight measured by gel permeation chromatography using polystyrene standards (GPC) of from about 10,000 to about 100,000; each B separately represents a polyethylene oxide segment having a number average molecular weight measured by GPC of from about 5,000 to about 200,000; X represents the radical of a polyfunctional coupling agent forming the nucleus of the multi arm block copolymer and, wherein n represents an integer from 2 to 12, preferably from 3 to 12.

Any suitable polyfunctional coupling agent can be employed to produce the multi arm block copolymer usable in this invention.

Suitable coupling agents are selected from the group consisting of polyepoxides, polyesters, polyhalides, polyisocyanates, polyimines, polyaldehydes, polyketones, polyanhydrides and polyacid chlorides.

Examples of specific suitable polyfunctional coupling agents are: epoxidized linseed oil, diethyladipate, silicon tetrahalide, toluene diisocyanate, 1,4,7-napthalene tricarboxaldehyde, 2,4,6-heptanetrione, pyromelletic dianhydride, mellitic acid chloride and the like The composition of the first copolymer containing an $\alpha,\beta$-ethylenically unsaturated dicarboxylic anhydride can vary widely and is limited only in that it may be water soluble after it is hydrolyzed. As the first copolymer, an equimolar copolymer is preferred, however, the amount of anhydride in the copolymer can vary within the range of from about 30 to 50 mole percent.

Any suitable $\alpha,\beta$-ethylenically unsaturated dicarboxylic anhydride can be employed.

Suitable anhydrides include: maleic anhydride, fumaric anhydride, itaconic anhydride, citraconic anhydride, mesaconic anhydride, aconitic anhydride, ethyl maleic anhydride, methyl itaconic anhydride and the like and their mixtures.

The polymer composition of this invention will contain from about 20 to about 80 weight percent of the multi arm block second copolymer and from about 80 to about 20 weight percent of the anhydride containing first copolymer. Preferably, each copolymer is present in an amount within the range of from about 40 to about 60 weight percent.

The polymer composition of this invention can be prepared using any suitable blending method such as described in the following Examples 4 and 5. The anhydride groups of first copolymer can be reacted with a strong base prior to blending. Preferably, however, the reaction with strong base occurs after polymer composition is prepared and recovered as described in Examples 4 and 5.

After the polymer composition is prepared it can be fabricated into any desired shape for use as, or incorporation into end use articles. Fabrication methods include but, are not limited to, injection molding, blow molding, extrusion, vacuum forming, casting, spinning and the like. The selection of the method of fabrication depends upon the ultimate end use, for example, the polymer composition can be utilized in the form of molded articles, laminates, extrudates, granules, powder, films, filaments, fibers, strands, yarns, woven fabrics, nonwoven mats and the like which, in turn, can be used together with other materials such as, for example, reinforcing fillers, to manufacture disposable diapers, catamenial tampons, surgical and dental sponges and the like.

In most end use applications achieving the maximum surface area of the polymer composition in contact with the liquid to be absorbed will be important. Accordingly, the polymer composition in fiberous form is particularly desirable in most applications. The following examples further demonstrate the invention.

EXAMPLE 1

This example demonstrates the preparation of a multi arm block second copolymer of this invention.

A one liter stirred Chemco reactor was charged with 650 ml purified tetrahydrofuran ("THF") and cooled to $-30°$ C. A trace of diphenylethylene (0.2 g) was added to the THF by means of a hypodermic needle. A solution of sec-butyllithium in cyclohexane was added to the reactor portionwise until a permanent deep red color was obtained. The solution was then back titrated with THF until the color just disappeared. The solution and reactor were then ready for polymerization of the monomers. Into the closed reactor were charged 2.42 m. moles of diphenylmethyl potassium (prepared according to the method described by Normant, Bull. Soc. Chim. Fr. 354, 1960) and 60 g. of styrene and the reactor held at −30° C. for about 30 minutes. Next, a charge of 118 g. of ethylene oxide was introduced and the mixture was heated to 30° C. and held constant for about 15 hours. Next 2.64 g. of toluene diisocyanate (TDI) was introduced into the reactor and the reactor contents held for 24 hours at room temperature. The polymerization was terminated by adding 1 g. of Polygard HR, a commercially available antioxidant. The polymer was recovered by flash distillation of unreacted monomers and solvent and dried at 70° C. until a constant weight was obtained. The resulting copolymer was analyzed and determined to have 3 arms with the polystyrene segments having number average molecular weights of about 23,000 and the ethylene oxide segments having number average molecular weights of about 21,000. Nuclear magnetic resonance spectroscopy (NMR) found that the copolymer contained, in weight percent, 54 styrene and 46 ethylene oxide.

EXAMPLE 2

Using substantially the same procedures of Example 1 and the following ingredients, another multi arm copolymer was prepared.

| Ingredient | Amount |
| --- | --- |
| THF | 650 ml |
| styrene | 50.6 g |
| ethylene | 115 g |
| diphenylmethyl potassium | 2.42 m. moles |
| TDI | 2.64 g |

The resulting copolymer was found (by NMR) to contain, in weight percent, 36 styrene and 64 ethylene oxide and, it was calculated that the copolymer had about 3 arms.

The multi arm block copolymers of Example 1 and 2 were separately compression molded at 260° F. and 20,000 psi pressure in a laboratory press. The resulting films were tough, translucent, and were found to possess the following physical properties.

| Property | Multi Arm Block Copolymer of | |
| --- | --- | --- |
| | Example 1 | Example 2 |
| Tensile Strength (D-638) | 4,920 psi | 2,670 psi |
| Elongation (D-638) | 150% | 320% |
| Glass Transition Temperature (Tg)[1] | 100° C. | 103° C. |
| Melting Point (Tm)[1] | 65.2° C. | 61.0° C. |

[1]Differential Scanning Calorimetry

EXAMPLE 3

This example demonstrates the preparation of a maleic anhydride containing first copolymer of this invention.

Into a citrate bottle were charged 25 g of styrene, 23.5 g of maleic anhydride, 50 g of ethyl acetate, 0.8 g of benzoyl peroxide and 10 drops of t-butyl dodecyl mercaptan. The bottle was placed in bottle polymerizer at 65° C. for 6 hours. The resulting polymer solution was diluted with MEK and the polymer was recovered by precipitation in methanol, washed with heptane and dried. Polymer analysis found 39 wt. % of maleic anhydride and a Tg of 208.5° C.

EXAMPLE 4

This example demonstrates the preparation of a polymer composition of this invention.

A solution containing 1.5 g of the styrene/maleic anhydride copolymer of Example 3 and 3.5 g of the styrene/ethylene oxide multi arm block copolymer of Example 2 in 200 ml of THF was prepared at the refluxing temperature of THF (70° C.) in the presence of few milliliters of water. The solution was held at 70° C. for one hour then cooled to room temperature. A thin film was then cast from the resulting polymer composition and the film was dried at 70° C. until a constant weight was obtained. The film was observed to be transparent, homogeneous, and very flexible. A sample of the resulting film was immersed in a 5 wt. % KOH aqueous solution for a period of about 12 hours. The immersed film was then washed with deionized water and dried.

EXAMPLE 5

Using substantially the procedure of Example 4, a polymer composition was prepared by blending 2 g of the styrene/maleic anhydride copolymer of Example 3 and 3 g of the multi arm copolymer of Example 2. Again a thin film of the composition was cast.

Samples of the cast film were separately immersed, one in a 5 wt. % KOH aqueous solution for a period of about 12 hours and the other in 10 wt. % KOH in ethanol for a period of about 16 hours. The immersed films were then washed with deionized water and methanol, respectively, and dried.

The following Table illustrates the deionized water and saline liquid absorption capacity of the polymer compositions of Examples 4 and 5.

TABLE

| Film of | Treatment | Composition (wt %) (First Copolymer/ Second Copolymer) | Water Uptake | |
| --- | --- | --- | --- | --- |
| | | | Deionized | Saline (0.9 wt %) |
| Multi Arm Copolymer (Example 1) | none | 0/100 | 313% | 306% |
| Polymer Composition (Example 4) | none | 30/70 | 100–150% | * |
| Polymer Composition (Example 4) | aqueous KOH | 30/70 | 5,200% | 1,200% |
| Polymer Composition (Example 5) | aqueous KOH | 40/60 | * | 2,100% |
| Polymer Composition | ethanol KOH | 40/60 | 16,000% | 2,400% |

| | | Composition (wt %) (First Copolymer/ | Water Uptake | |
|---|---|---|---|---|
| Film of | Treatment | Second Copolymer | Deionized | Saline (0.9 wt %) |
| (Example 5) | | | | |

*not tested

The data of the Table show that the polymer compositions of this invention possess excellent water and saline liquid absorption capacity, and, accordingly, will serve to impart high liquid absorption capacity to products, such as disposable diapers, when incorporated into such products.

It will be evident from the foregoing that various modifications can be made to this invention. Such, however, are considered as being within the scope of the invention.

What is claimed is:

1. An article having excellent water and saline liquid absorption capacity comprised of a polymer composition which comprises a first copolymer of recurring units of an $\alpha,\beta$-ethylenically unsaturated dicarboxylic anhdyride and recurring units of at least one monomer selected from the group consisting of ethylene, propylene, isobutylene, a $C_1$ to $C_4$ alkyl acrylate, a $C_1$ to $C_4$ alkyl substituted methacrylate, vinyl acetate, methyl vinyl ether and a styrenic monomer having the formula:

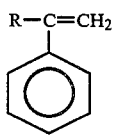

wherein r represents hydrogen, an alkyl group having from 1 to 6 carbon atoms and wherein the benzene ring may be substituted with low molecular weight alkyl, or hydroxy groups; and, a multi arm block second copolymer of styrene and ethylene oxide, wherein at least a portion of the recurring anhydride units of said first copolymer have been hydrolyzed to form hydrogen atoms thereon and wherein at least a portion of the oxide groups on the ethylene oxide are interacted with the said hydrogen atom so that said first copolymer and said second copolymer are linked by hydrogen bonds, said second copolymer having the following formula

wherein each A separately represents a polystyrene segment having a number average molecular weight of from about 10,000 to about 100,000; each B separately represents a polyethylene oxide segment having a number average molecular weight of from about 5,000 to about 200,000; X represents the radical of a polyfunctional coupling agent forming the nucleus of the multi arm block copolymer and n represents an integer from 2 to 12.

2. The article of claim 1 in which in said polymer composition at least a portion of the anhydride units are modified by reaction with a strong base.

3. A method of absorbing water and saline liquid the method comprises the step of contacting the water and the saline liquid with an article of a polymer composition comprising a first copolymer of recurring units of an $\alpha,\beta$-ethylenically unsaturated dicarboxylic anhydride and recurring units of at least one monomer selected from the group consisting of ethylene, propylene, isobutylene, a $C_1$ to $C_4$ alkyl acrylate, a $C_1$ to $C_4$ alkyl substituted methacrylate, vinyl acetate, methyl vinyl ether and a styrenic monomer having the formula:

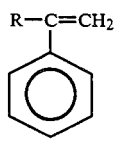

wherein R represents hydrogen, an alkyl group having from 1 to 6 carbon atoms and wherein the benzene ring may be substituted with low molecular weight alkyl, or hydroxy groups; and a multi arm block second copolymer of styrene and ethylene oxide, wherein at least a portion of the recurring anhydride units of said first copolymer have been hydrolyzed to form hydrogen atoms thereon and wherein at least a portion of the oxide groups of the ethylene oxide blocks are interacted with the said hydrogen atoms so that said first copolymer and said second copolymer are linked by hydrogen bonds, said second copolymer having the following formula

wherein each A separately represents a polystyrene segment having a number average molecular weight of from about 10,000 to about 100,000; each B separately represents a polyethylene oxide segment having a number average molecular weight of from about 5,000 to about 200,000; X represents the radical of a polyfunctionaly coupling agent forming the nucleus of the multi arm block copolymer and n represents an integer from 2 to 12.

4. The method of claim 3 comprising reacting the anhydride units of the first copolymer with a strong base.

* * * * *